United States Patent
Sawada (10) Patent No.: US 7,671,886 B2
(45) Date of Patent: Mar. 2, 2010

(54) VIDEO-PHONE TERMINAL APPARATUS, IMAGE-SHOOTING METHOD, AND COMPUTER PRODUCT

(75) Inventor: Kimihiro Sawada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1141 days.

(21) Appl. No.: 11/227,142

(22) Filed: Sep. 16, 2005

(65) Prior Publication Data

US 2007/0002128 A1 Jan. 4, 2007

(30) Foreign Application Priority Data

Jun. 17, 2005 (JP) ............................... 2005-178033

(51) Int. Cl.
*H04N 7/14* (2006.01)
*H04M 1/00* (2006.01)

(52) U.S. Cl. .............. 348/14.01; 348/14.02; 348/14.05; 379/102.01

(58) Field of Classification Search ... 348/14.01–14.16; 455/556.1, 404.1; 379/102.01, 102.2, 102.3, 379/110.01

See application file for complete search history.

(56) References Cited

U.S. PATENT DOCUMENTS

| 5,640,195 | A | * | 6/1997 | Chida | 348/14.01 |
| 6,704,040 | B2 | | 3/2004 | Sato | 348/14.02 |
| 6,788,332 | B1 | * | 9/2004 | Cook | 348/14.02 |
| 7,424,310 | B1 | * | 9/2008 | Barbeau | 455/556.1 |
| 2004/0032503 | A1 | | 2/2004 | Monden et al. | 348/207 |

FOREIGN PATENT DOCUMENTS

| EP | 1 401 177 A1 | 3/2004 |
| JP | 2002-57808 A | 2/2002 |
| JP | 2003-018254 | 1/2003 |
| WO | WO03/003698 A | 1/2003 |

* cited by examiner

*Primary Examiner*—Melur Ramakrishnaiah
(74) *Attorney, Agent, or Firm*—Hanify & King, PC (57) ABSTRACT

A remote-operation authenticating unit determines whether to permit a remote operation of the video-phone terminal apparatus by other video-phone terminal apparatus via a video phone communication. A remote operation unit receives, from the other video-phone terminal apparatus, a request for a control including at least a shutter control of the image capturing device to shoot an image, and executes the control in response to the request. An image converting unit converts the image into an image for the video phone communication. A communicating unit transmits the image for the video phone communication to the other video-phone terminal apparatus.

11 Claims, 7 Drawing Sheets

| KEY | CONTROL CONTENT |
|---|---|
| MENU | SWITCHING OBJECT OF OPERATION (LOCAL TERMINAL/OTHER TERMINAL) |
| 1 | ZOOM IN |
| 2 | INCREASE BRIGHTNESS |
| 3 | INCREASE COLOR DENSITY |
| 4 | ZOOM OUT |
| 5 | REDUCE BRIGHTNESS |
| 6 | REDUCE COLOR DENSITY |
| 7 | CONFIRM IMAGE SHOT |
| 8 | TRANSMIT IMAGE SHOT |
| 0 | SHUTTER RELEASE |

FIG.7

VIDEO-PHONE TERMINAL APPARATUS, IMAGE-SHOOTING METHOD, AND COMPUTER PRODUCT

BACKGROUND OF THE INVENTION

1. Field of the Invention

The present invention relates to a video-phone terminal apparatus having a function of shooting an image via a remote operation.

2. Description of the Related Art

Recently, most mobile phones have a built in image capturing function. The mobile phones are also provided with a large size liquid-crystal-display (LCD) screen, which enables a user to shoot oneself while confirming an image shot. This is what is called a self-photography, and is becoming common as a new trend in photography.

The self-photography is suitable for shooting a part of the body, such as face, of a few persons including the user. However, because the distance between the image capturing device and the subjects is restricted to a length of an arm of the user, the self-photography cannot be used to shoot more than several persons, entire body of a person, or a subject with a huge background.

In general, a reliable third party is necessary to take a photograph when a desired photograph cannot be taken by means of the self-photography. However, such a method is not available when there is no reliable third party nearby. A technology disclosed in Japanese Patent Laid-Open Publication No. 2003-18254 enables the user to take a photograph by means of remote operation of a mobile phone having an image capturing function using another mobile phone.

However, when taking a photograph using the conventional technology, the user cannot immediately confirm a result of shooting. In the conventional technology, the image is transmitted from the mobile phone that undergoes remote operation to the mobile phone of the user by means of a communication such as an E-mail. Transmission of the shot image via the communication can result in a time delay during transmission and reception of the image shot. In most cases there is a need for improvisation when taking a photograph. However, in the conventional technology using the remote operation of the mobile phone, the user cannot immediately confirm the result of shooting after taking a photograph.

SUMMARY OF THE INVENTION

It is an object of the present invention to at least solve the problems in the conventional technology.

A video-phone terminal apparatus according to one aspect of the present invention, which has an image capturing device, includes a remote-operation authenticating unit that determines whether to permit a remote operation of the video-phone terminal apparatus by other video-phone terminal apparatus via a video phone communication; a remote operation unit that receives, from the other video-phone terminal apparatus that is permitted to perform the remote operation of the video-phone terminal apparatus, a request for a control including at least a shutter control of the image capturing device to shoot an image, and executes the control in response to the request; an image converting unit that converts the image into an image for the video phone communication; and a communicating unit that transmits the image for the video phone communication to the other video-phone terminal apparatus.

A method according to another aspect of the present invention, which is for shooting an image using a video-phone terminal apparatus having an image capturing device, includes determining whether to permit a remote operation of the video-phone terminal apparatus by other video-phone terminal apparatus via a video phone communication; receiving, from the other video-phone terminal apparatus that is permitted to perform the remote operation of the video-phone terminal apparatus, a request for a control including at least a shutter control of the image capturing device to shoot the image; executing the control in response to the request; converting the image into an image for the video phone communication; and transmitting the image for the video phone communication to the other video-phone terminal apparatus.

A computer-readable recording medium according to still another aspect of the present invention stores a computer program that causes a computer to execute the above method according to the present invention.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention are explained in detail below with reference to the accompanying drawings.

Figure 1:
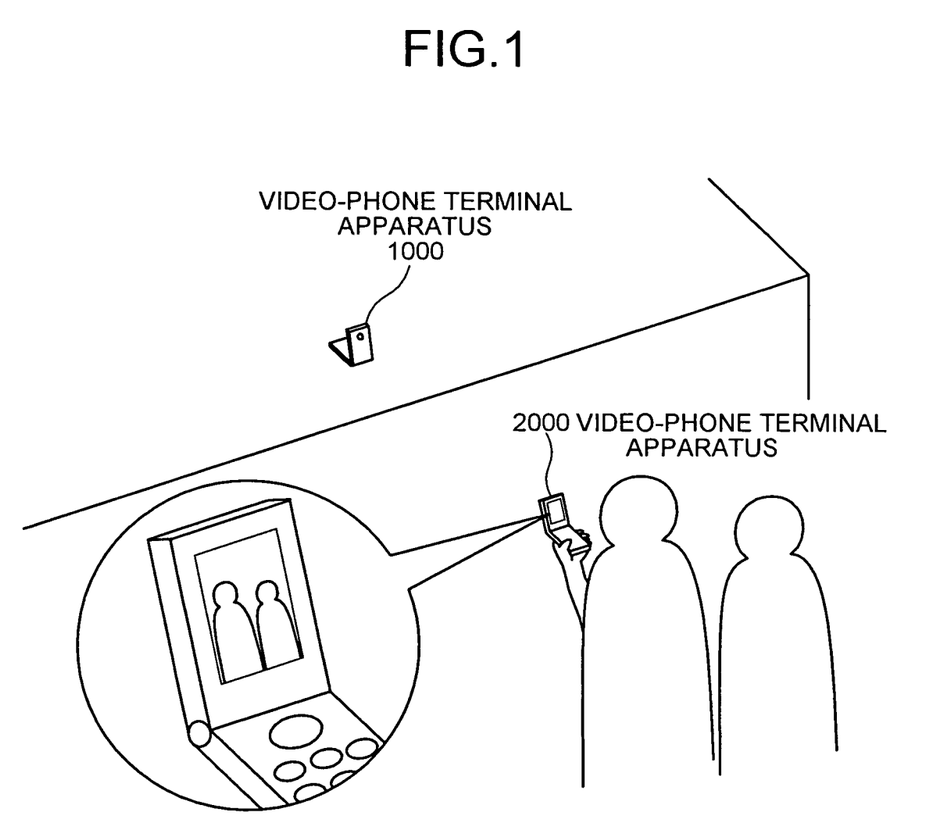
FIG. 1 is a schematic for illustrating a photographing method according to an embodiment of the present invention.

FIG. 1 is a schematic for illustrating a photographing method according to an embodiment of the present invention. As shown in FIG. 1, two video-phone terminal apparatuses are used in the photographing method according to the present embodiment. A video-phone terminal apparatus according to the present embodiment includes a laptop computer or a handheld terminal provided with a video phone function. According to the present embodiment, a mobile phone provided with the video phone function is used to explain the concept of the photographing method.

Two subjects are shown in FIG. 1. Each of the subjects has a video-phone terminal apparatus. Thus, photograph is taken using two video-phone terminal apparatuses with a remote operation.

A video-phone terminal apparatus 1000 is provided with a video phone function and an image capturing function. Apart from the differences based on moving image and still image, and presence or absence of audio, image resolution also differs in the video phone function and in the image capturing function. An image provided by the video phone function is of low resolution and low quality due to limitations of communication cost and communication bandwidth. An image provided by the image capturing function is of high resolution and high quality.

A video-phone terminal apparatus 2000 is provided with the video phone function. Although the video-phone terminal apparatus 2000 can also be provided with the image capturing function, the image capturing function of the video-phone terminal apparatus 2000 is not used in the photographing method according to the present embodiment.

In the photographing method according to the present embodiment the video-phone terminal apparatus 1000 is setup at a distant location, and one of the photographic objects remotely operates the video-phone terminal apparatus 1000 via the video-phone terminal apparatus 2000 to take a photograph. When taking a photograph, a video phone communication is established between the video-phone terminal apparatus 1000 and the video-phone terminal apparatus 2000. The image shot with the aid of the image capturing function of the video-phone terminal apparatus 1000 is converted into a video phone image and transmitted from the video-phone terminal apparatus 1000 to the video-phone terminal apparatus 2000.

By transmitting the image that is shot using the image capturing function with the aid of the video phone function, a user operating the video-phone terminal apparatus 2000, who is also the photographic object, can take a photograph while confirming the composition of the shot image. Moreover, because the image transmitted by the video phone function is of low quality and enables comprehension of cast and brightness of the image, by remotely operating the image capturing function of the video-phone terminal apparatus 1000 from the video-phone terminal apparatus 2000, cast and brightness of the image can be adjusted while confirming the result.

Although photographing a still image is explained in the aforementioned example, the photographing method according to the present embodiment can also be used to photograph a moving image. Many of the recent mobile phones enable the user to take a high quality photograph of a moving image. Thus, by applying the photographing method according to the present embodiment to remotely operate such mobile phones having a moving image photographing function, a moving image can be shot while confirming the results.

Figure 2:
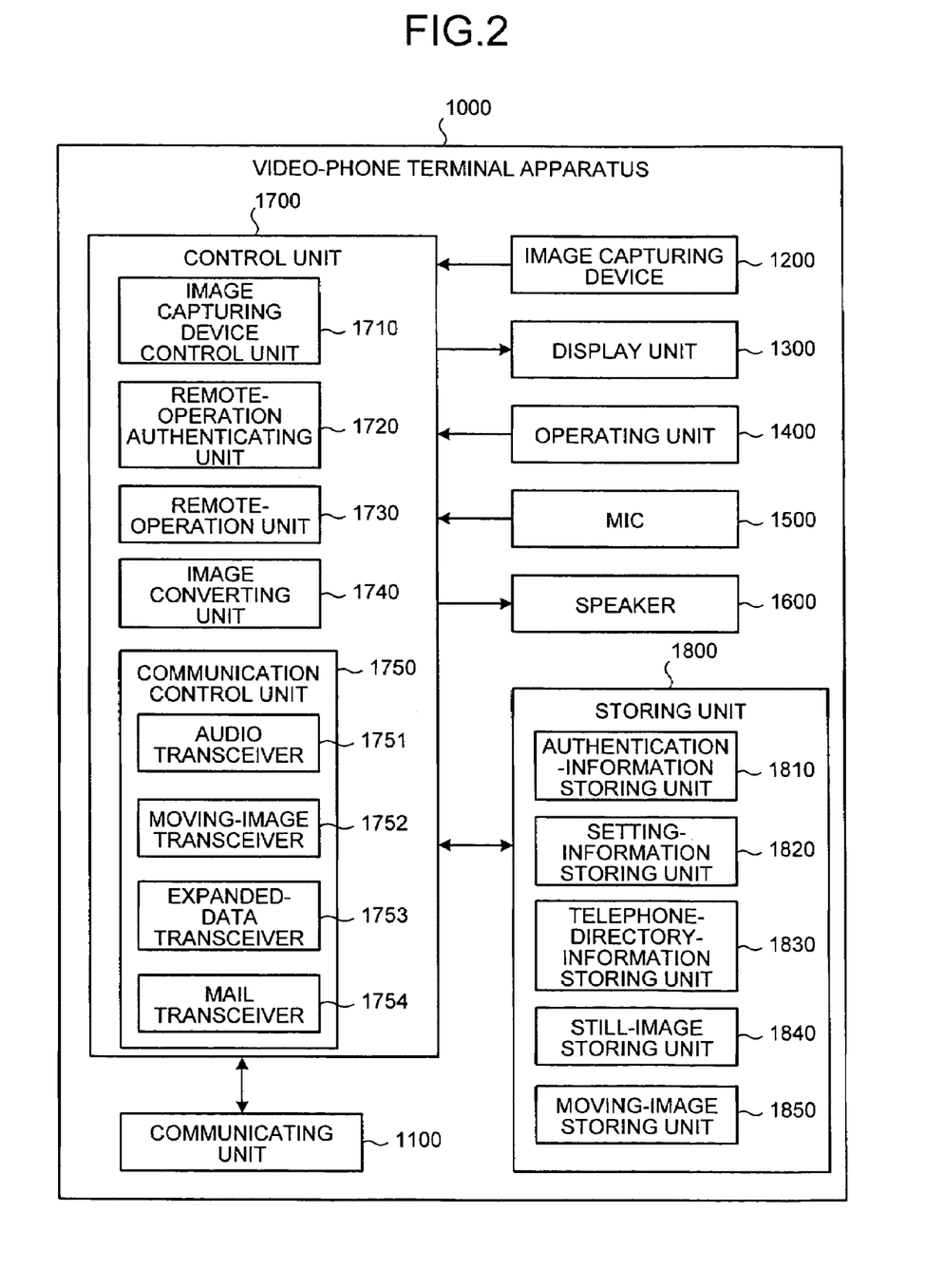
FIG. 2 is a block diagram of a video-phone terminal apparatus 1000.

FIG. 2 is a block diagram of the video-phone terminal apparatus 1000 shown in FIG. 1. The video-phone terminal apparatus 1000 includes a communicating unit 1100, an image capturing device 1200, a display unit 1300, an operating unit 1400, a microphone (mic) 1500, a speaker 1600, a control unit 1700, and a storing unit 1800.

The communicating unit 1100 is a device that establishes a wireless communication to carry out an audio call and a video phone call. When carrying out a video phone call, the communicating unit 1100 combines audio data transmitted from an audio transceiver 1751, moving-image data transmitted from a moving-image transceiver 1752, and expanded data transmitted from an expanded-data transceiver 1753, and transmits the combined data to other video-phone terminal apparatus. Further, the communicating unit 1100 receives a signal from the other video-phone terminal apparatus, divides the received signal into audio data, moving-image data, and expanded data, and distributes the audio data, the moving-image data, and the expanded data to the audio transceiver 1751, the moving-image transceiver 1752, and the expanded-data transceiver 1753 respectively.

The image capturing device 1200 can photograph a still image as well as a moving image. Although according to the present embodiment, the same image capturing device is used to photograph a still image and a moving image, image capturing devices that exclusively photograph a still image and a moving image can also be provided separately. The display unit 1300 is a display device such as a crystal screen etc. that displays various types of information. The operating unit 1400 is an input device provided with a plurality of buttons.

The mic 1500 collects the sound of a call. The speaker 1600 outputs an audio or a phone ringing sound.

The control unit 1700 controls the entire video-phone terminal apparatus 1000 and includes an image capturing device control unit 1710, a remote-operation authenticating unit 1720, a remote operation unit 1730, an image converting unit 1740, and a communication control unit 1750. The image capturing device control unit 1710 controls the image capturing device 1200. The image capturing device control unit 1710 carries out shutter control, zoom control, and control of color and brightness of an image.

The remote-operation authenticating unit 1720 determines whether to permit remote operation from other video-phone terminal apparatus. The remote-operation authenticating unit 1720 permits remote operation only from a prior specified video-phone terminal apparatus to prevent remote operation from an unspecified video-phone terminal apparatus. Although a method to determine whether to permit remote operation is not specified in the present invention, a telephone number of a video-phone terminal apparatus from which remote operation is permitted can be stored beforehand in an authentication-information storing unit 1810 and remote operation can be permitted only if there is a call from a video-phone terminal apparatus having the telephone number that is stored in the authentication-information storing unit 1810.

A time limit can also be added to the conditions that are used by the remote-operation authenticating unit 1720 to determine whether to permit remote operation. If remote operation from a video-phone terminal apparatus is permitted by means of a setting and if such a setting is permanent, later an undesirable remote operation can also be received from the video-phone terminal apparatus that is permitted to carry out remote operation unless the setting is erased. By making the permission of remote operation valid only for 30 minutes, for example, after the setting, such an undesirable remote operation can be avoided.

The remote operation unit 1730 receives a control command transmitted from the video-phone terminal apparatus that is permitted to carry out a remote operation, and executes control according to the received control command. The control command is received as expanded data embedded in wireless signals of a video-phone terminal apparatus. The expanded data is used to embed in the wireless signals of a video-phone terminal apparatus, data other than moving-image data or audio data. By using the expanded data, the control command can be transmitted and received without modifying the setup provided by the telephone company.

The remote operation unit 1730 controls the image capturing device control unit 1710 etc. according to the received control command. For example, if the received control command is a zoom up instruction, the remote operation unit 1730 controls the image capturing device control unit 1710 to increase the magnification of the lens of the image capturing device 1200. If the received control command is an instruction to modify cast or brightness of the image, the remote operation unit 1730 controls the image capturing device control unit 1710 to change adjustment content of the image.

If the received control command is a shutter release instruction, in other words, an instruction to take a photograph, the remote operation unit 1730 controls the image capturing device control unit 1710 causing the image capturing device 1200 to take a photograph, and the shot still-image data is stored in a still-image storing unit 1840 of the storing unit 1800. The shot still-image data is transmitted to the image converting unit 1740, converted to a resolution used in a video phone, the converted image is transmitted to the moving-image transceiver 1752, and transmitted as a video phone image for a specified time interval (for example, 20 seconds).

Thus, by automatically reproducing the shot image on a video phone screen, the user who remotely operates the other video-phone terminal apparatus can be shown the shot image. The time interval to transmit the shot image can be set in a setting-information storing unit 1820 of the storing unit 1800. Further, the shot image can also be continuously transmitted to the other video-phone terminal apparatus by means of a setting without limiting the time interval until a specific control signal is transmitted from the other video-phone terminal apparatus. The shot image can also be set in a way so that the shot image is not automatically reproduced as a video phone image.

When controlling the image capturing device control unit 1710 and causing the image capturing device 1200 to take a photograph, a shutter sound can also be transmitted as a video phone audio with the aid of the audio transceiver 1751. By transmitting the shutter sound, the user who remotely operates the other video-phone terminal apparatus can be informed that the photograph has actually been taken.

If the received control command is an instruction to photograph a moving image, the remote operation unit 1730 controls the image capturing device control unit 1710 causing the image capturing device 1200 to photograph a moving image. The shot moving image is stored in a moving-image storing unit 1850 of the storing unit 1800.

If the received control command is an instruction to transmit the shot data, the remote operation unit 1730 transmits the shot data stored in the storing unit 1800 to a mail transceiver 1754 and causes the shot data to be transmitted to the other video-phone terminal apparatus by means of a mail. A mail address of the mail destination that corresponds to the telephone number of the incoming call can be fetched from a telephone-directory-information storing unit 1830 of the storing unit 1800, or the mail address can be stored in the authentication-information storing unit 1810 with the telephone number of the video-phone terminal apparatus that is permitted to carry out remote operation.

Apart from transmission in the form of a mail, the shot data can also be embedded as expanded data in the wireless signals of the video-phone terminal apparatus. If the other video-phone terminal apparatus includes a normal mail receiving function, the shot data can be easily transmitted to the other video-phone terminal apparatus in the form of a mail without the necessity of a special mechanism for receiving the shot data. When transmitting the shot data in the form of expanded data, a mechanism to extract the shot data from the expanded data needs to be provided in the other video-phone terminal apparatus. However, because data is transmitted with the aid of well-connected video phone line, the shot data can be transmitted without fail.

If the setting-information storing unit 1820 of the storing unit 1800 includes a setting that enables automatic transmission the shot data after taking the photograph, the remote operation unit 1730 can transmit the shot data without waiting for an instruction to transmit the shot data. Automatic transmission of the shot data can reduce the operations required on part of the user. Moreover, deletion of the shot data after completion of the automatic transmission can remove the necessity of providing a large storage capacity in the video-phone terminal apparatus undergoing remote operation to store the shot data.

When other video-phone terminal apparatus remotely operates the video-phone terminal apparatus 1000, the remote operation unit 1730 displays an appropriate message and the control content in the display unit 1300. When a message pertaining to the video-phone terminal apparatus 1000 undergoing remote operation is displayed in the display unit 1300, pressing a specific key of the operating unit 1400 can terminate the remote operation. Thus, by providing the user with a mechanism that notifies the user of remote operation as well as a mechanism that enables the user to forcibly terminate the remote operation, any undesirable remote operation can be terminated.

The image converting unit 1740 coverts an image shot by the image capturing device 1200 or the shot data stored in the storing unit 1800 to a video phone image and transmits the video phone image to the moving-image transceiver 1752.

After the remote-operation authenticating unit 1720 has permitted remote operation, the image converting unit 1740 starts converting the image shot by the image capturing device 1200 into a video phone image. The video-phone terminal apparatus 1000 continues to transmit the converted image as a video phone screen to the video-phone terminal apparatus 2000 that is the source of the incoming call. If a still image is shot, or if there is a confirmation request for the shot data from the video-phone terminal apparatus 2000, the image converting unit 1740 converts the shot data stored in the storing unit 1800 and transmits the converted data as a video phone screen.

The communication control unit 1750 controls a call or data communication. The communication control unit 1750 includes the audio transceiver 1751, the moving-image transceiver 1752, the expanded-data transceiver 1753, and the mail transceiver 1754. The audio transceiver 1751 controls transmission and reception of audio for an audio call or a video phone call. The moving-image transceiver 1752 controls transmission and reception of a moving image for a video phone call. The expanded-data transceiver 1753 controls transmission and reception of expanded data embedded in the wireless signals of a video phone call. The mail transceiver 1754 controls transmission and reception of mails.

The storing unit 1800 stores various types of information and includes the authentication-information storing unit 1810, the setting-information storing unit 1820, the telephone-directory-information storing unit 1830, the still-image storing unit 1840, and the moving-image storing unit 1850.

The authentication-information storing unit 1810 stores the information that is used by the remote-operation authenticating unit 1720 to determine whether to allow remote operation from a video-phone terminal apparatus that is the source of an incoming call. The setting-information storing unit 1820 stores various types of setting information. The telephone-directory-information storing unit 1830 stores a list that includes telephone numbers, mail addresses etc. of persons making a call. The still-image storing unit 1840 stores a still image shot by the image capturing device 1200. The moving-image storing unit 1850 stores a moving image shot by the image capturing device 1200.

Figure 3:
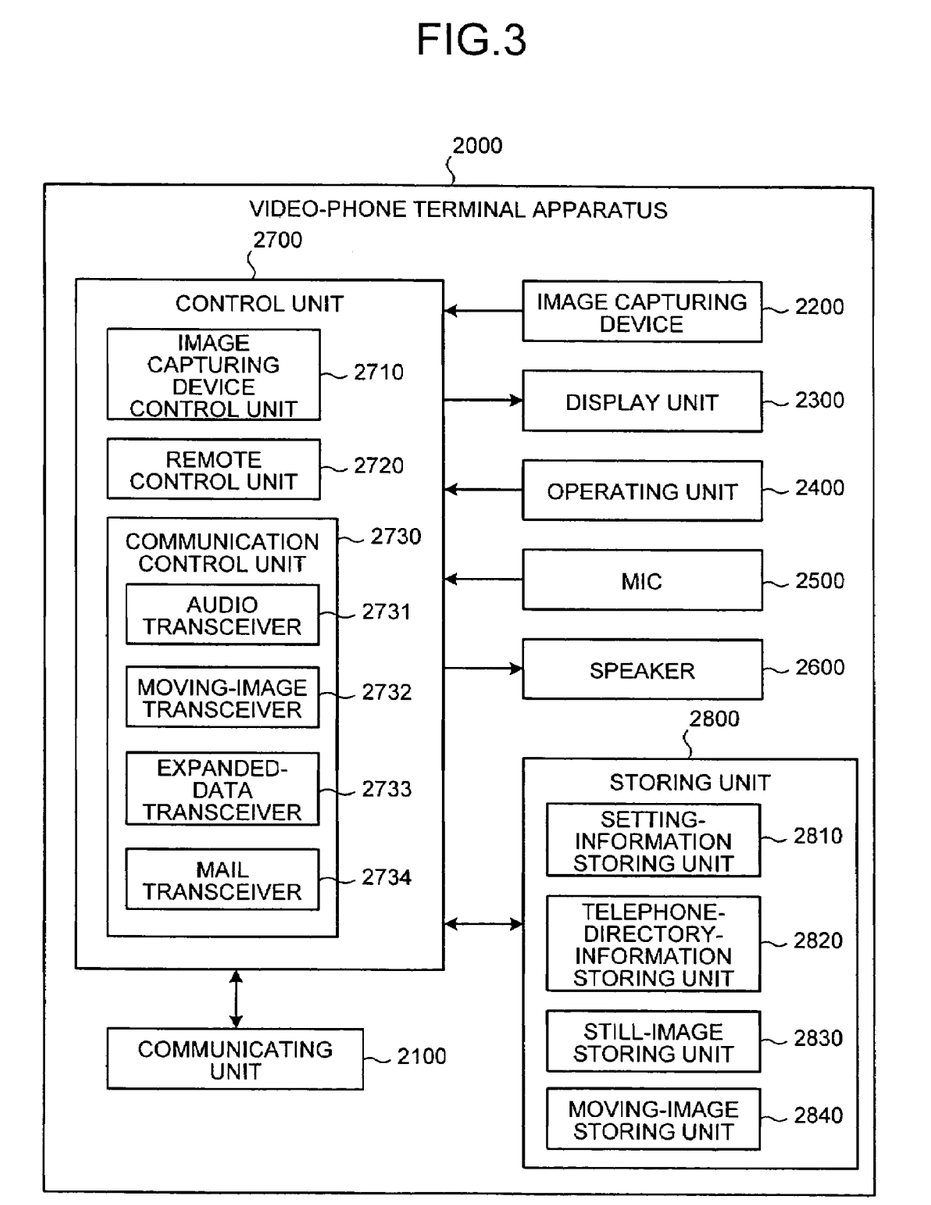
FIG. 3 is a block diagram of a video-phone terminal apparatus 2000.

FIG. 3 is a block diagram of the video-phone terminal apparatus 2000 shown in FIG. 1. The video-phone terminal apparatus 2000 includes a communicating unit 2100, an image capturing device 2200, a display unit 2300, an operating unit 2400, a mic 2500 a speaker 2600, a control unit 2700, and a storing unit 2800.

The communicating unit 2100, the image capturing device 2200, the display unit 2300, the operating unit 2400, the mic 2500, and the speaker 2600 are similar to the communicating unit 1100, the image capturing device 1200, the display unit 1300, the operating unit 1400, the mic 1500, and the speaker 1600 shown in FIG. 2 respectively, hence the detailed explanation is omitted.

The control unit 2700 controls the entire video-phone terminal apparatus 2000 and includes an image capturing device control unit 2710, a remote control unit 2720, and a communication control unit 2730. The image capturing device control unit 2710 is similar to the image capturing device control unit 1710 shown in FIG. 2.

The remote control unit 2720 remotely controls a video-phone terminal apparatus that is making a video phone call. When the video-phone terminal apparatus 2000 has entered a remote operation mode by means of operation of a button of the operating unit 2400 during a video phone call, pressing any button of the operating unit 2400 generates a control command corresponding to the pressed button, and the generated command is transmitted to the other video-phone terminal apparatus as expanded data.

Figure 4:
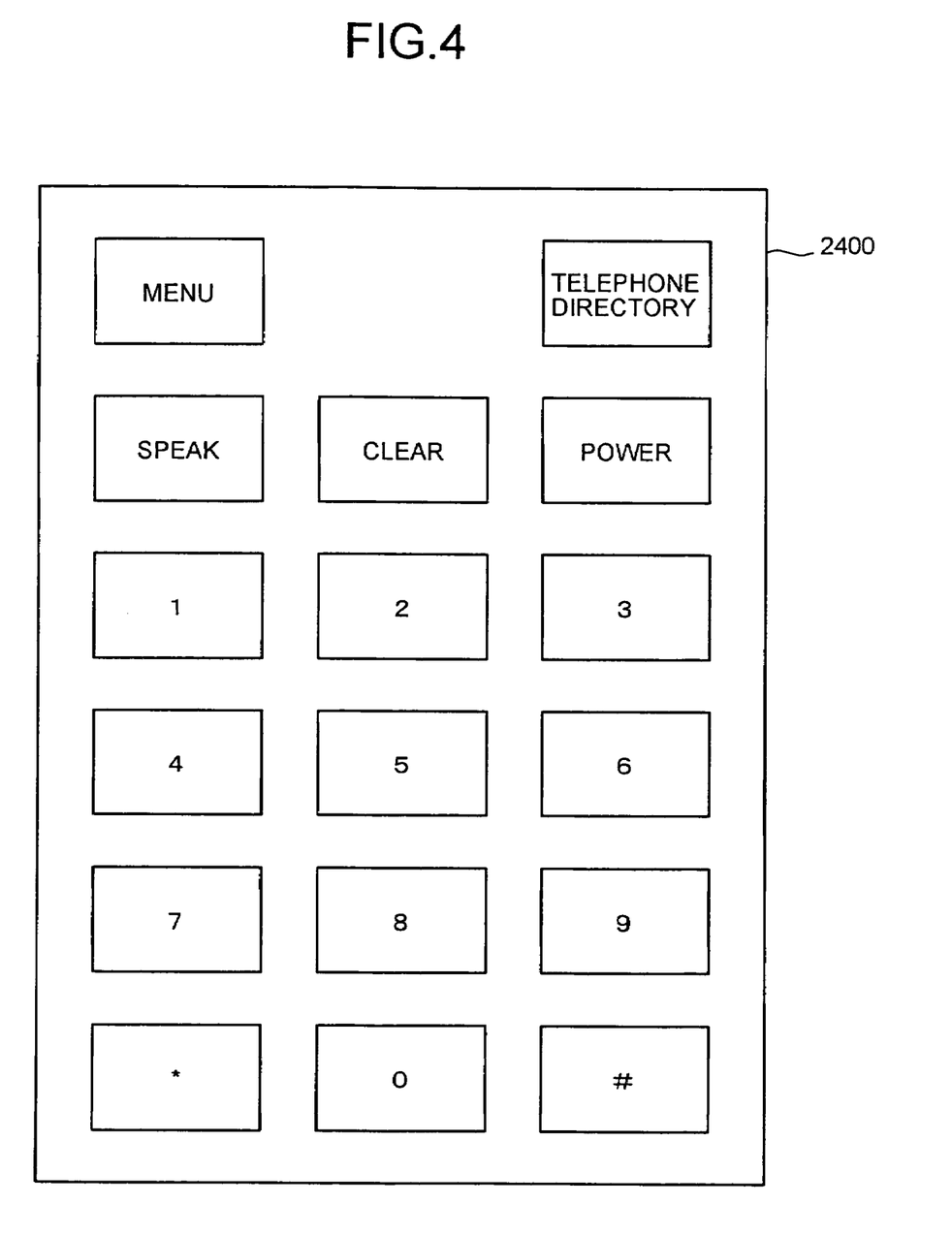
FIG. 4 is a schematic for illustrating an example of an operating unit 2400 shown in FIG. 3.

FIG. 4 is a schematic for illustrating an example of the operating unit 2400 shown in FIG. 3. The operating unit 2400 is provided with buttons such as numeric keys "0" through "9" and a "MENU" key for menu display.

Figure 5:
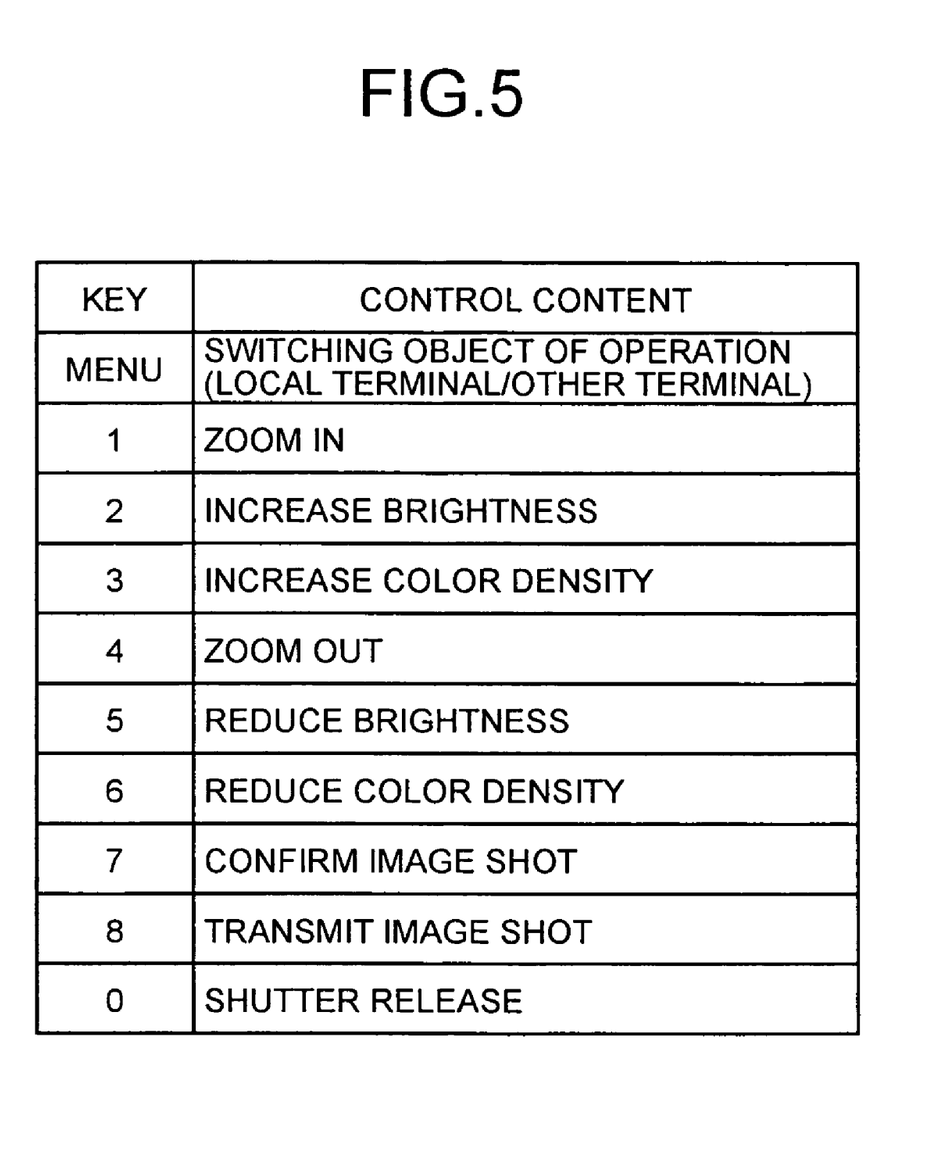
FIG. 5 is a schematic for illustrating an example of control content assigned to buttons of the operating unit 2400.

FIG. 5 is a schematic for illustrating an example of control content assigned to buttons of the operating unit 2400. The "MENU" key is assigned a switching function to switch between a remote operation mode in which other video-phone terminal apparatus becomes the object of remote operation and a normal mode in which the video-phone terminal apparatus 2000 becomes the object of remote operation.

Each of the keys "1", "2", "3", "4", "5", "6", "7", "8" and "0" are assigned the control contents "zoom in", "increase brightness", "increase color density", "zoom out", "reduce brightness", "reduce color density", "confirm shot data", "transmit shot data", and "shutter release" respectively.

Referring back to FIG. 3, the communication control unit 2730 controls a call and data communication. The communication control unit 2730 includes an audio transceiver 2731, a moving-image transceiver 2732, an expanded-data transceiver 2733, and a mail transceiver 2734. The audio transceiver 2731, the moving-image transceiver 2732, the expanded-data transceiver 2733, and the mail transceiver 2734 are similar to the audio transceiver 1751, the moving-image transceiver 1752, the expanded-data transceiver 1753, and the mail transceiver 1754 shown in FIG. 2 respectively.

The storing unit 2800 stores various types of information and includes a setting-information storing unit 2810, a telephone-directory-information storing unit 2820, a still-image storing unit 2830, and a moving-image storing unit 2840.

The setting-information storing unit 2810 stores various types of setting information. The telephone-directory-information storing unit 2820 stores a list that includes telephone numbers, mail addresses etc. of persons making a call. The still-image storing unit 2830 stores a still image transmitted from a video-phone terminal apparatus that is remotely operated by the video-phone terminal apparatus 2000. The moving-image storing unit 2840 stores a moving image transmitted from a video-phone terminal apparatus that is remotely operated by the video-phone terminal apparatus 2000.

Figure 6:
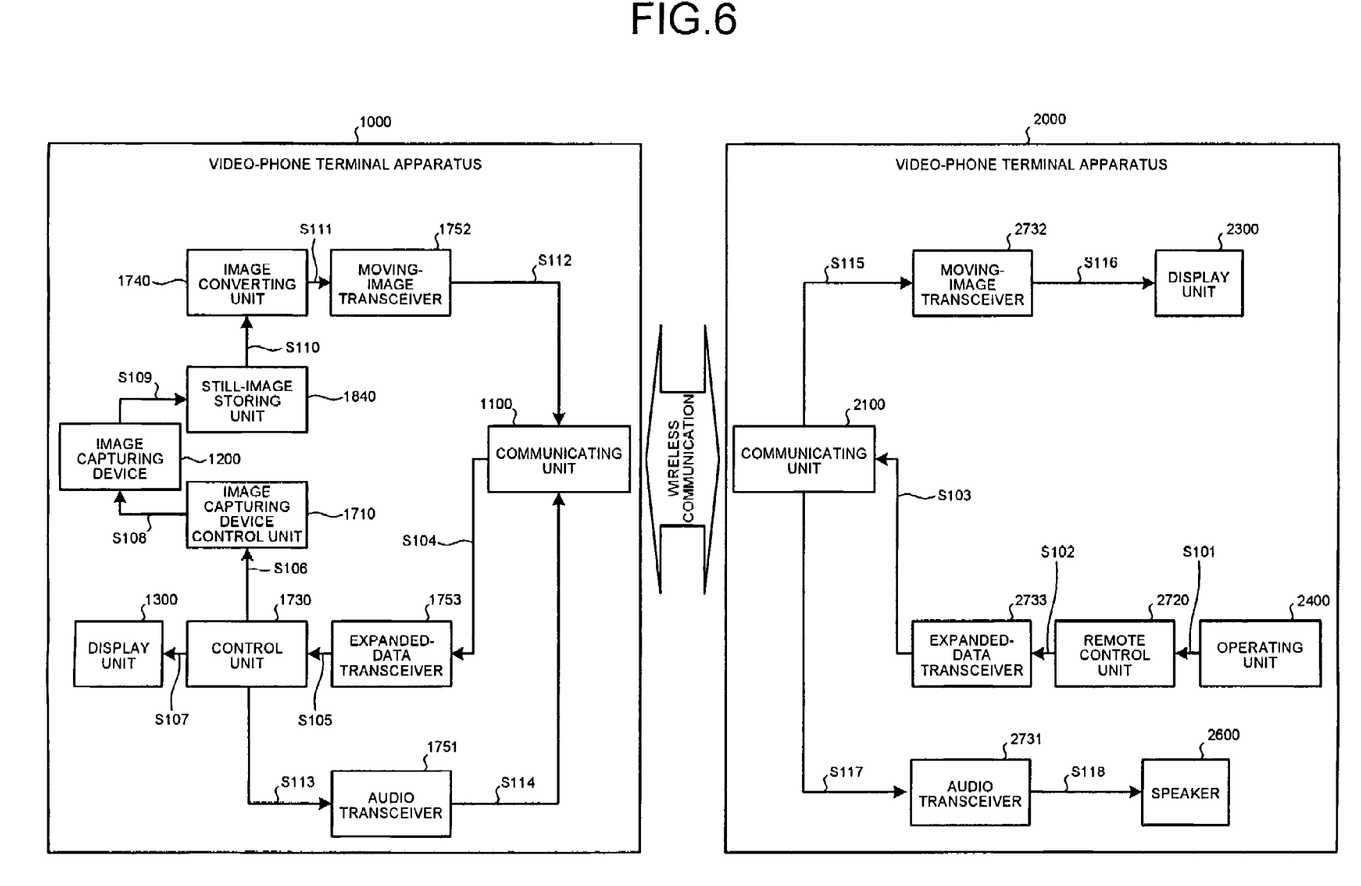
FIG. 6 is a schematic for illustrating a flow of information in the photographing method according to the present embodiment.

FIG. 6 is a schematic for illustrating a flow of information in the photographing method according to the present embodiment.

When the user presses a key in the operating unit 2400 of the video-phone terminal apparatus 2000 to make a shutter release request (step S101), a control command for shutter release is generated in the remote control unit 2720 (step S102). The generated control command is formulated as expanded data in the expanded-data transceiver 2733 (step S103), combined with audio data etc. and transmitted to the video-phone terminal apparatus 1000 from the communicating unit 2100.

The communicating unit 1100 of the video-phone terminal apparatus 1000 divides the received wireless signal into moving-image data, audio data, and expanded data, and distributes the expanded data to the expanded-data transceiver 1753 (step S104). The expanded-data transceiver 1753 extracts the control command from the expanded data and distributes the extracted control command to the remote operation unit 1730 (step S105).

The remote operation unit 1730, upon determining that the control command is a shutter release request, instructs the image capturing device control unit 1710 to photograph a still image (step S106). A message pertaining to photographing of a still image is displayed in the display unit 1300 (step S107).

The image capturing device control unit 1710 follows the instruction from the remote operation unit 1730 and causes the image capturing device 1200 to photograph a still image (step S108), and the shot data is stored in the still-image storing unit 1840 (step S109). The image converting unit 1740 reads the stored shot data (step S110), converts the shot data to a data for video phone communication, and distributes the converted data to the moving-image transceiver 1752 (step S111). The moving-image transceiver 1752 further distributes the distributed data to the communicating unit 1100 as a moving-image data (step S112).

The remote operation unit 1730, after instructing the image capturing device control unit 1710 to photograph a still image, distributes shutter sound data to the audio transceiver 1751 (step S113). The distributed shutter sound data is formulated as audio data in the audio transceiver 1751 and further distributed to the communicating unit 1100 (step S114). The communicating unit 1100 combines the distributed expanded data and the audio data, and transmits the combined data to the video-phone terminal apparatus 2000.

The communicating unit 2100 of the video-phone terminal apparatus 2000 divides the received wireless signal into moving-image data, audio data, and expanded data, and distributes the moving-image data to the moving-image transceiver 2732 (step S115). The moving-image transceiver 2732 displays the moving-image data in the display unit 2300 (step S116). The communicating unit 2100 distributes the audio data to the audio transceiver 2731 (step S117), and the audio data is output from the speaker 2600 (step S118).

Thus, the video-phone terminal apparatus 1000 photographs a still image by means of remote operation of the operating unit 2400 of the video-phone terminal apparatus 2000, the shot image is displayed as a video phone image in the display unit 2300 of the video-phone terminal apparatus 2000, and the shutter sound is output from the speaker 2600.

Figure 7:
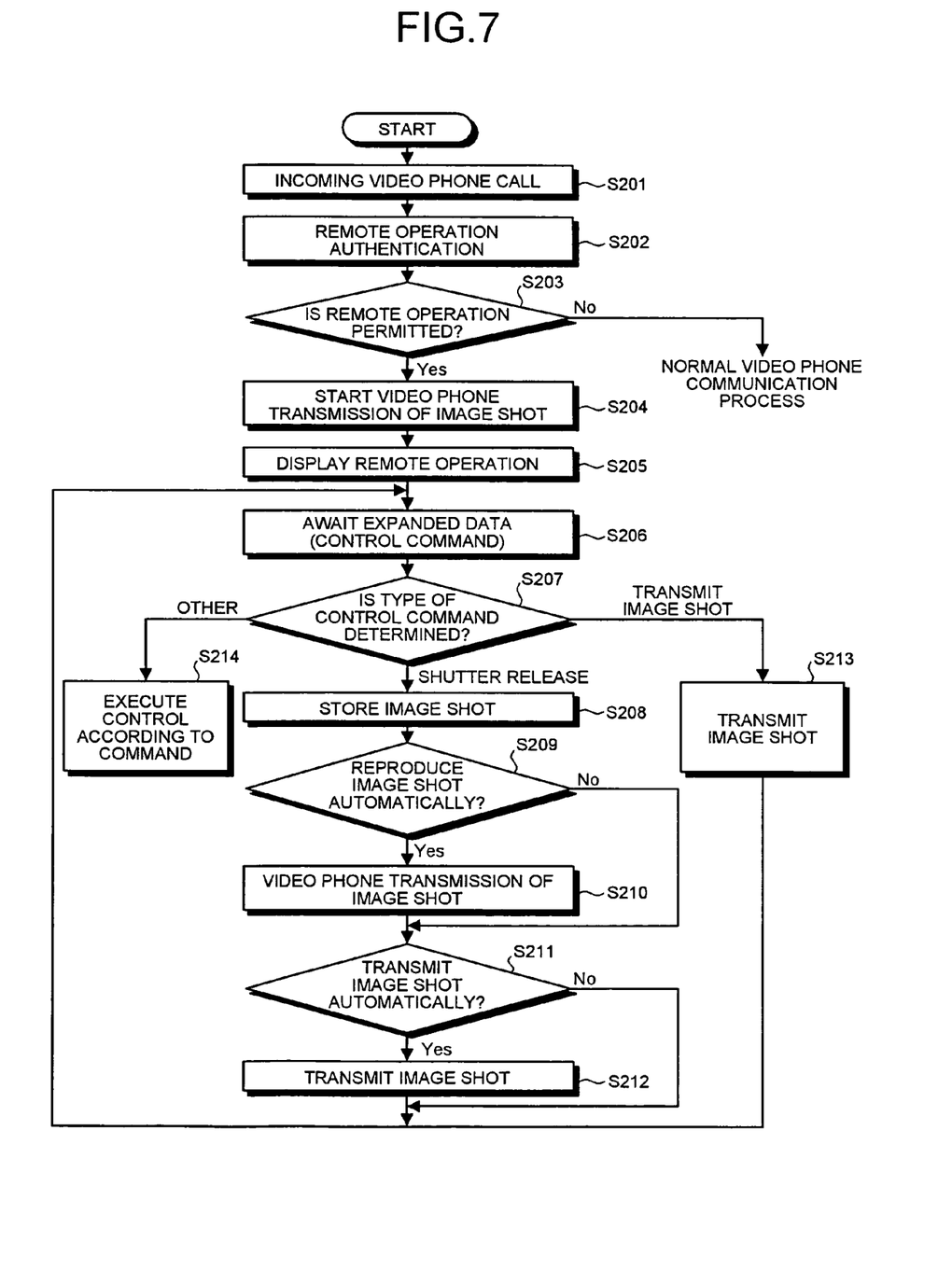
FIG. 7 is a flow chart of a process procedure of the video-phone terminal apparatus 1000 shown in FIG. 2.

FIG. 7 is a flow chart of a process procedure of the video-phone terminal apparatus 1000 shown in FIG. 2. When there is a video phone call from a video-phone terminal apparatus (step S201), the video-phone terminal apparatus 1000 confirms whether to permit remote control from the video-phone terminal apparatus that is the source of the video phone call (step S202). If remote control from the video-phone terminal apparatus is not permitted ("No" at step S203), the video-phone terminal apparatus 1000 carries out a normal video phone call process.

If the remote-operation authenticating unit 1720 permits remote control from the video-phone terminal apparatus that is the source of the video phone call ("Yes" at step S203), the video-phone terminal apparatus 1000 starts transmission of the shot data to the video-phone terminal apparatus that is the source of the video phone call (step S204), and displays a message in the display unit 1300 indicating that the video-phone terminal apparatus 1000 is under remote control (step S205).

The video-phone terminal apparatus 1000 receives a control command transmitted in the form of expanded data (step S206) and executes a process according to the type of the received control command. If the control command is a shutter release instruction ("shutter release" at step S207), the image capturing device control unit 1710 of the video-phone terminal apparatus 1000 causes the image capturing device 1200 to photograph an image and the shot image is stored in the storing unit 1800 (step S208).

If the setting-information storing unit 1820 has a setting for automatic reproduction of the shot image ("Yes" at step S209), the shot image data is transmitted as a video phone image to the video-phone terminal apparatus that is the source of the video phone call (step S210). If the setting-information storing unit 1820 has a setting for automatic transmission of the shot data ("Yes" at step S211), the shot image data is automatically transmitted to the video-phone terminal apparatus that is the source of the video phone call in the form of a mail or expanded data (step S212).

If the control command is an instruction to transmit the shot data ("transmit shot data" at step S207), the video-phone terminal apparatus 1000 transmits the shot data to the video-phone terminal apparatus that is the source of the video phone call in the form of a mail or expanded data (step S213), and if the control command is any other instruction ("other" at step S208), the video-phone terminal apparatus 1000 executes control according to the control command (step S214).

If a process according to the control command is complete, the process returns to step S206 to await next control command.

The aforementioned sequence of the process can also be executed by means of a prior formulated photographing program. The photographing program can be stored in a nonvolatile memory etc. inside the video-phone terminal apparatus 1000, the stored photographing program can be read by a computer (processor) mounted on the video-phone terminal apparatus 1000 and executed.

According to the present embodiment, a user who carries out the remote operation can shoot a still image while confirming an actual image shot.

Furthermore, a user who carries out the remote operation can shoot a moving image while confirming an actual image shot.

Moreover, an unanticipated remote operation at a later point of time can be prevented even if the user forgets to remove the setting that permits remote operation.

Furthermore, a user of a video-phone terminal apparatus can be notified of any unanticipated remote operation carried out at a later point of time.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A video-phone terminal apparatus having an image capturing device, the video-phone terminal apparatus comprising:
    a remote-operation authenticating unit that determines whether to permit a remote operation of the video-phone terminal apparatus by other video-phone terminal apparatus via a video phone communication;
    a remote operation unit that receives, from the other video-phone terminal apparatus that is permitted to perform the remote operation of the video-phone terminal apparatus, a request for a control including at least a shutter control of the image capturing device to shoot an image, and executes the control in response to the request;
    an image converting unit that converts the image into an image for the video phone communication;
    a communicating unit that transmits the image for the video phone communication to the other video-phone terminal apparatus;
    a display unit that displays various types of information; and
    an operating unit that accepts operations, wherein
    the remote operation unit displays in the display unit, when the remote-operation authenticating unit permits the remote operation of the video-phone terminal apparatus by the other video-phone terminal apparatus, a notification message indicating a permission of the remote operation of the video-phone terminal apparatus by the other video-phone terminal apparatus, and wherein
    the remote operation unit terminates the remote operation of the video-phone terminal apparatus by the other video-phone terminal apparatus, if a predetermined operation is performed on the operating unit while the remote operation unit displays the notification message in the display unit.

2. The video-phone terminal apparatus according to claim 1, wherein the image is a still image.

3. The video-phone terminal apparatus according to claim 1, wherein the image is a moving image.

4. The video-phone terminal apparatus according to claim 1, wherein the remote-operation authenticating unit invalidates authentication information for determining whether to permit the remote operation of the video-phone terminal apparatus by the other video-phone terminal apparatus after a predetermined time limit.

5. The video-phone terminal apparatus according to claim 1, wherein the communicating unit transmits the image converted by the image converting unit to the other video-phone terminal apparatus for a predetermined time.

6. The video-phone terminal apparatus according to claim 1, wherein the request is embedded in expanded data for the video phone communication.

7. The video-phone terminal apparatus according to claim 1, wherein
    the image is embedded in expanded data for the video phone communication, and
    the communicating unit transmits the expanded data for the video phone communication to the other video-phone terminal apparatus.

8. The video-phone terminal apparatus according to claim 1, wherein the communicating unit transmits the image to the other video-phone terminal apparatus via an electronic mail.

9. The video-phone terminal apparatus according to claim 1, wherein the remote operation unit outputs, when shooting the still image, a shutter sound to the other video-phone terminal apparatus as an audio for the video phone communication.

10. A method of shooting an image using a video-phone terminal apparatus having an image capturing device, the method comprising:
    determining whether to permit a remote operation of the video-phone terminal apparatus by other video-phone terminal apparatus via a video phone communication;

receiving, from the other video-phone terminal apparatus that is permitted to perform the remote operation of the video-phone terminal apparatus, a request for a control including at least a shutter control of the image capturing device to shoot the image;

executing the control in response to the request;

converting the image into an image for the video phone communication;

transmitting the image for the video phone communication to the other video-phone terminal apparatus;

displaying in a display unit of the video-terminal apparatus, when the remote operation of the video-phone terminal apparatus by the other video-phone terminal apparatus is permitted, a notification message indicating a permission of the remote operation of the video-phone terminal apparatus by the other video-phone terminal apparatus; and terminating the remote operation of the video-phone terminal apparatus by the other video-phone terminal apparatus, if a predetermined operation is performed on an operating unit of the video-terminal apparatus while the notification message is displayed in the display unit.

11. A computer-readable recording medium that stores a computer program for controlling a video-phone terminal apparatus having an image capturing device, wherein the computer program causes a computer to execute:

determining whether to permit a remote operation of the video-phone terminal apparatus by other video-phone terminal apparatus via a video phone communication;

receiving, from the other video-phone terminal apparatus that is permitted to perform the remote operation of the video-phone terminal apparatus, a request for a control including at least a shutter control of the image capturing device to shoot an image;

executing the control in response to the request;

converting the image into an image for the video phone communication; and transmitting the image for the video phone communication to the other video-phone terminal apparatus;

displaying in a display unit of the video-terminal apparatus, when the remote operation of the video-phone terminal apparatus by the other video-phone terminal apparatus is permitted, a notification message indicating a permission of the remote operation of the video-phone terminal apparatus by the other video-phone terminal apparatus; and terminating the remote operation of the video-phone terminal apparatus by the other video-phone terminal apparatus, if a predetermined operation is performed on an operating unit of the video-terminal apparatus while the notification message is displayed in the display unit.

* * * * *